United States Patent [19]

Stapley et al.

[11] Patent Number: 5,713,193
[45] Date of Patent: Feb. 3, 1998

[54] SELF-CLEANING RAKE

[76] Inventors: Linda D. Stapley; Allen Y. Guinn, both of 706 S. 6th St., Cottonwood, Ariz. 86326

[21] Appl. No.: 701,636

[22] Filed: Aug. 22, 1996

[51] Int. Cl.[6] .................................................. A01D 7/06
[52] U.S. Cl. ............................. 56/400.08; 56/400.16
[58] Field of Search ........................ 56/400.1, 400.08, 56/400.09, 400.16, 400.21, 400.19, 400.18

[56] References Cited

U.S. PATENT DOCUMENTS 4,776,158  10/1988  Baum ............................. 56/400.16 X
5,501,069   3/1996  Lentz ............................. 56/400.1

FOREIGN PATENT DOCUMENTS 851758  10/1960  United Kingdom ............. 56/400.08

*Primary Examiner*—Terry Lee Melius

[57] ABSTRACT

A self-cleaning rake consists of a handle, a grip, a spring release button, and two sets of tines. The handle is made from fiberglass and consists of two telescoping pieces. One of the pieces is larger in diameter and the other piece is slidably retained within it. The smaller handle piece is provided with a cleaning bar to which one set of tines are attached, and the cleaning bar further has a plurality of aligned apertures through which a second set of tines extend. The second set of tines are attached to the first handle piece, and reciprocable movement of the handle pieces relative to each other results in the cleaning bar and its attached tines moving in a manner which effects a removal of debris from both sets of tines.

10 Claims, 3 Drawing Sheets

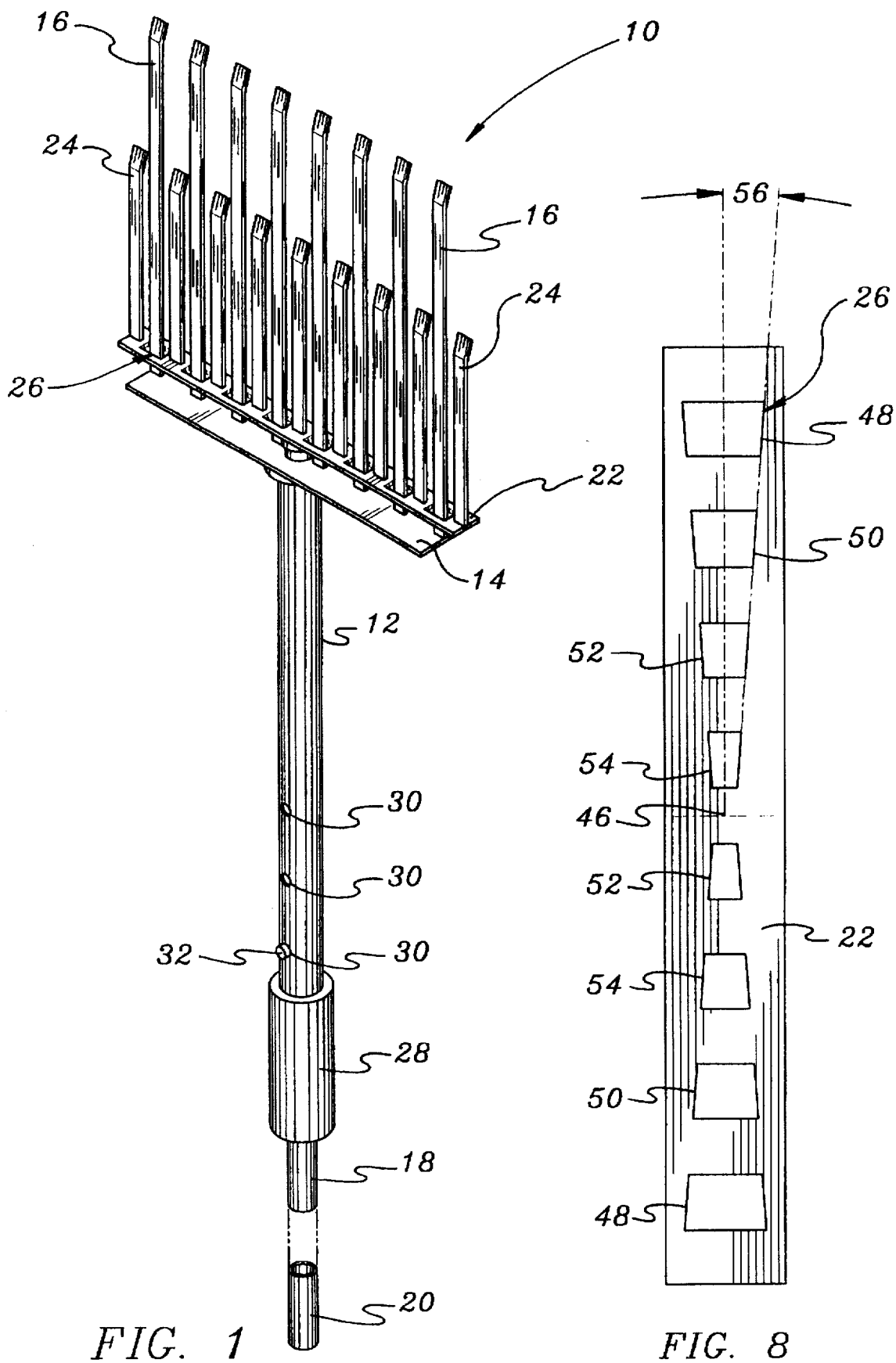

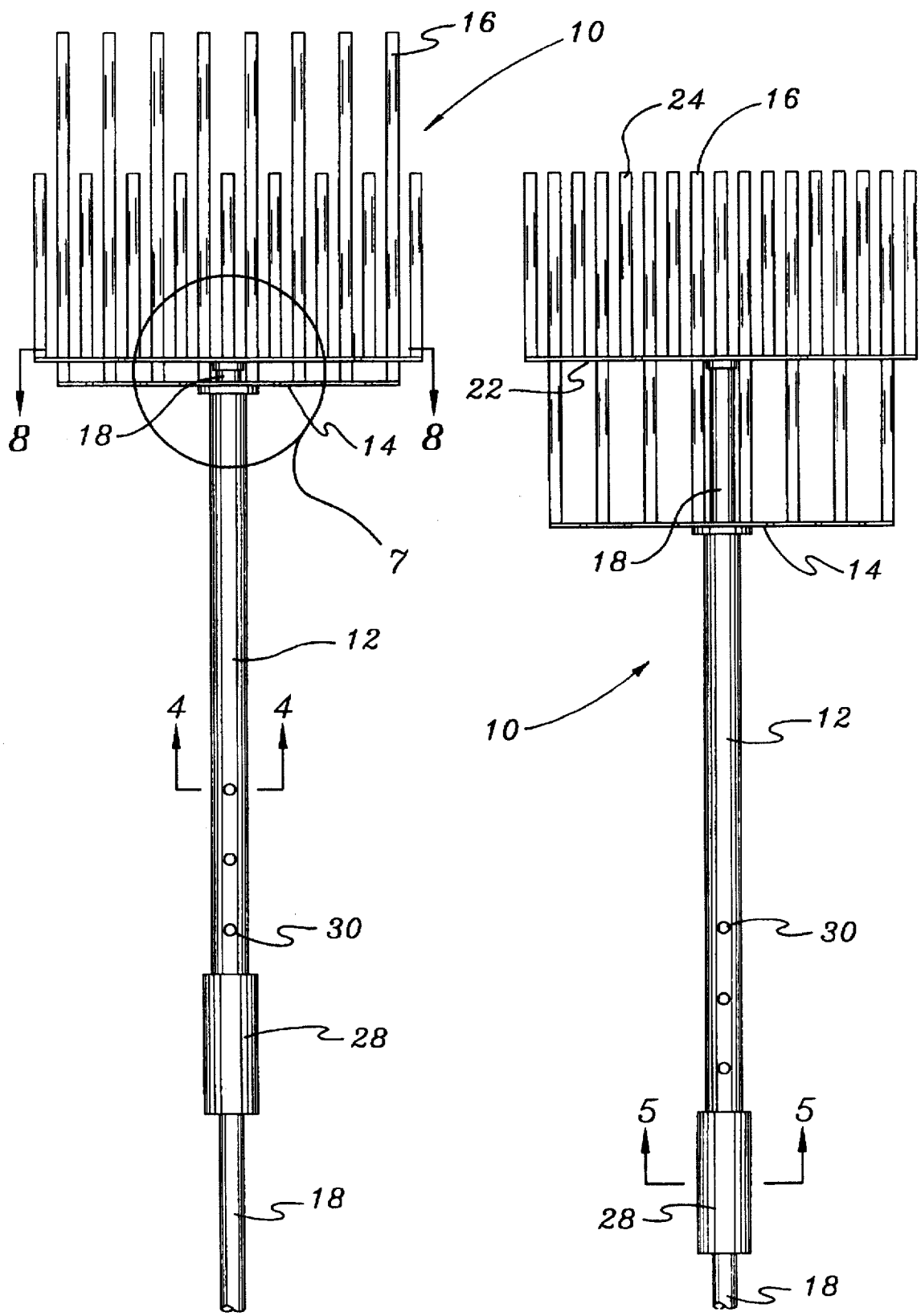

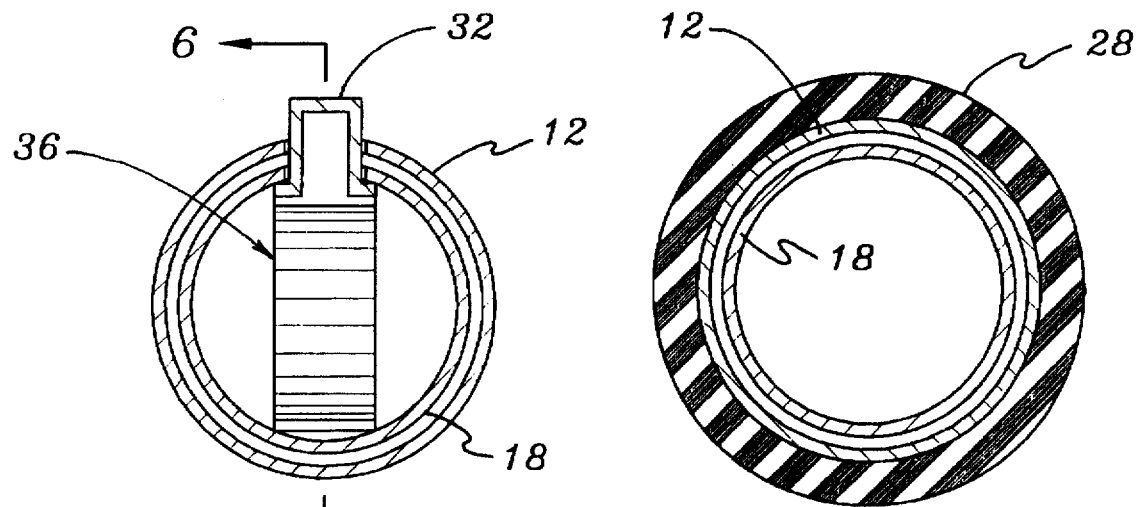
FIG. 4
FIG. 5
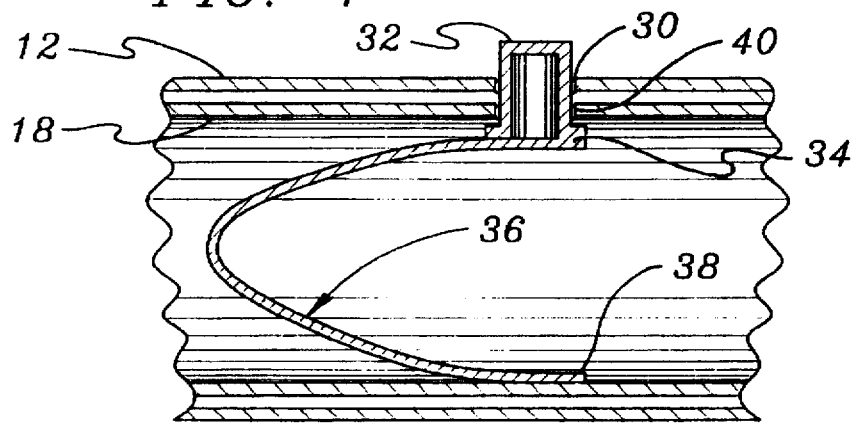
FIG. 6
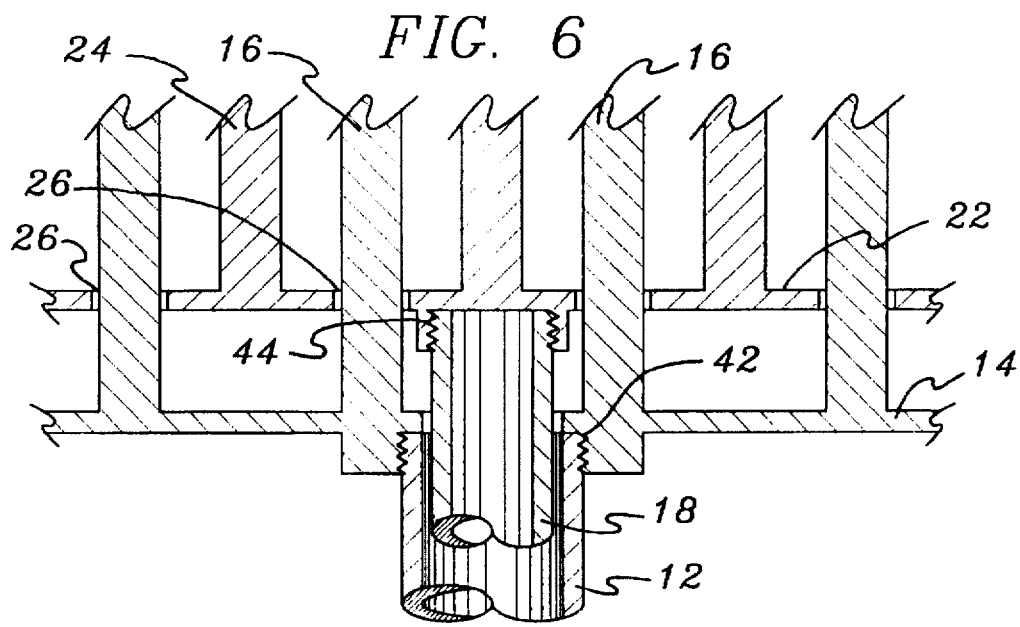
FIG. 7

SELF-CLEANING RAKE

BACKGROUND OF THE INVENTION

1. Field of the Invention

The present invention relates to rakes and more particularly pertains to a self-cleaning rake for removing debris which becomes captured in the rake's tines.

2. Description of the Prior Art

The use of self-cleaning rakes is known in the prior art. This is evidenced by the granting of a number of patents relating to various functional and structural aspects of self-cleaning rakes. An example of a known pertinent patent includes U.S. Pat. No. 4,850,185 which issued to Dimon on Jul. 25, 1989 and which is directed to a self-cleaning rake. Flexible tines are utilized in this rake whereby a reciprocable movement of the handle structure allows the end prongs or teeth of the tines to be drawn into tubes extending throughout the length of an attached cleaning shield. The cleaning shield is rigidly affixed to the rake handle, and the head and tines are moved longitudinally upwardly and downwardly along the rake handle by means of a hand grip located near the top of the rake handle.

Another form of cleaning device for a self-cleaning rake is to be found in U.S. Pat. No. 4,165,598 which issued to Kutsi on Aug. 28, 1979. The rake shown in this patent relies upon a cleaning plate which is pivotally mounted on the handle for pivotal movement relative to the rake head frame and tines. The plate is formed with a multiplicity of spaced holes through which the tines extend as the plate is pivotally moved to and from the rake head. A spring action is used to effect continual plate movement as the rake is used.

A patent which is more pertinent to the construction of the present invention is U.S. Pat. No. 5,305,591 which issued to Gibson, Jr. on Apr. 26, 1994. This patent discloses a raking implement having an integral tine cleaner. The tines are transversely flexible, allowing the movement of a cleaning bar, which also serves a stress distributor and tine separator, along and about and to distal ends of the tines for the purpose of removing lodged debris. The cleaning bar is attached to and operated by a hollow actuator which moves along and about the rake handle.

Another patent which discloses a cleaning bar on a self-cleaning leaf rake is U.S. Pat. No. 4,776,158 which issued to Baum on Oct. 11, 1988. The conventional rake shown in this patent includes a stripper bar on the teeth which is movable by a push rod on the handle of the rake from a raised raking position to a lowered leaf push-off position.

While each of these prior art patents disclose devices which fulfill their respective particular objectives and requirements, and are most likely quite functional for their intended purposes, it will be noticed that none of these patents disclose a self-cleaning rake for removing lodged debris from tines on a rake, wherein a cleaning bar is used both for removing lodged debris from the rake tines while at the same time serving as a support for an additional set of tines.

As such, there apparently still exists the need for an improved self-cleaning rake structure which utilizes a dual set of tines which can be moved relative to one another so as to effect both a debris removal function and a variance in tine ground contacting structure to accommodate different types of raking operations. In this respect, the present invention substantially fulfills this need.

SUMMARY OF THE INVENTION

In view of the foregoing disadvantages inherent in the known types of self-cleaning rakes now present in the prior art, the present invention provides a new self-cleaning rake wherein the same can be utilized to provide a variable tine structure through the use of relatively movable tines. As such, the general purpose of the present invention, which will be described subsequently in greater detail, is to provide a new and improved self-cleaning rake assembly and method which has many of the advantages of the self-cleaning rakes mentioned heretofore and many additional novel features that result in a self-cleaning rake which is not anticipated, rendered obvious, suggested, or even implied by any of the prior art self-cleaning rakes, either alone or in any combination thereof.

To attain this, the present invention generally comprises a self-cleaning rake which consists of a handle, a grip, a spring release button, and two sets of tines. The handle is made from fiberglass and consists of two telescoping pieces. One of the pieces is larger in diameter and the other piece is slidably retained within it. The smaller handle piece is provided with a cleaning bar to which one set of tines are attached, and the cleaning bar further has a plurality of aligned apertures through which a second set of tines extend. The second set of tines are attached to the first handle piece, and reciprocal movement of the handle pieces relative to each other results in the cleaning bar and its attached tines moving in a manner which effects a removal of debris from both sets of tines.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new self-cleaning rake and method which has many of the advantages of the self-cleaning rakes mentioned heretofore and many novel features that result in a self-cleaning rake which is not anticipated, rendered obvious, suggested, or even implied by any of the prior art self-cleaning rakes, either alone or in any combination thereof.

It is another object of the present invention to provide a new self-cleaning rake which may be easily and efficiently manufactured and marketed.

It is a further object of the present invention to provide a new self-cleaning rake which is of a durable and reliable construction.

An even further object of the present invention is to provide a new self-cleaning rake which is susceptible of a low cost of manufacture with regard to both materials and labor, and which accordingly is then susceptible of low prices of sale to the consuming public, thereby making such self-cleaning rake economically available to the buying public.

Still yet another object of the present invention is to provide a new self-cleaning rake which provides in the apparatuses and methods of the prior art some of the advantages thereof, while simultaneously overcoming some of the disadvantages normally associated therewith.

Still another object of the present invention is to provide a new and improved self-cleaning rake which facilitates the use of a rake having a cleaning bar wherein the cleaning bar is also utilized as a tine support member.

Yet another object of the present invention is to provide a new and improved self-cleaning rake which provides relatively moveable tines so as to vary the ground-engaging structure of the rake.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the self-cleaning rake comprising the present invention.

FIG. 2 is a top plan view of the invention.

FIG. 3 is a top plan view of the invention showing it in an operable position.

FIG. 4 is a cross-sectional view of the invention as viewed along the line 4—4 in FIG. 2.

FIG. 5 is a cross-sectional view of the invention as viewed along the line 5—5 in FIG. 3.

FIG. 6 is a cross-sectional view of the invention as viewed along the line 6—6 in FIG. 4.

FIG. 7 is a partial cross-sectional detail view as indicated in FIG. 2.

FIG. 8 is a cross-sectional view of the invention as viewed along the line 8—8 in FIG. 2.

DESCRIPTION OF PREFERRED EMBODIMENTS

With reference now to the drawings, and in particular to FIGS. 1–3 thereof, a new self-cleaning rake embodying the principles and concepts of the present invention and generally designated by the reference numeral 10 will be described.

More specifically, it will be noted that the self-cleaning rake 10 essentially comprises a first tubular handle member 12 having an orthogonally attached cross bar member 14. The bar member 14 has a plurality of orthogonally attached tines, each of which is generally designated by the reference numeral 16, and these tines are substantially parallelly aligned with the tubular handle 12.

The self-cleaning rake 10 further has a second tubular handle member 18 which is of a smaller cross-sectional diameter than the first tubular handle member 12 and which is concentrically and reciprocally disposed within a hollow interior portion of the first tubular handle. The second tubular handle member 18 extends completely through the hollow interior portion of the first tubular handle member 12, with a handle grip 20 being disposed at one free end thereof and a cross-extending cleaning bar 22 being attached to the remaining free end. The cleaning bar 22 is orthogonally aligned to the second tubular handle member 18 and has a plurality of aligned tines, each of which is generally designated by the reference numeral 24, which are fixedly secured thereto and which are substantially parallelly aligned with both the first tubular handle 12 and the second tubular handle 18.

The cleaning bar 22 is provided with a plurality of spaced-apart, aligned through-extending apertures, all of which are generally designated by the reference numeral 26. The array 26 of apertures are spaced and aligned to receive each of the tines 16 wherein these tines are slidably disposed within the apertures so as to allow relative movement to occur between the cleaning bar 22 and the tines.

Other features relating to the self-cleaning rake 10 shown in FIGS. 1–3 includes a foam grip member 28 which is attached to an outer peripheral surface of the tubular handle member 12, and several apertures, each of which are generally designated by the reference numeral 30, disposed in the tubular handle 12 with such apertures being positioned to receive a depressible spring-release button 32 which operates to provide locking engagement between the handle members 12, 18.

FIGS. 4, 5, and 6 illustrate some of the interior structural features of the invention 10. For example, it can be seen that the depressible release button 32 is fixedly attached to one end 34 of a U-shaped spring member 36 which has its remaining free end 38 fixedly secured to an interior surface of the tubular handle member 18. The U-shaped spring member 36 operates in a conventional manner to move the button 32 outwardly through one of the aligned apertures 30, while also being directed through an aperture 40 in the handle member 18. As best shown in FIG. 6, this positioning of the button 32 through the aligned apertures 30, 40 operates to provide locking engagement between the handle members 12, 18 thereby to prevent any further relative movement therebetween.

FIG. 5 has been provided for the purpose of illustrating that the foam grip handle member 28 extends completely around the outer circumferential surface of the tubular handle member 12 and is in a tight abutting relationship thereto. As such, slidable movement is frictionally prevented between the handle member 28 and an outer surface of the tubular handle member 12 whereby the grip operates as a firm retaining means for the self-cleaning rake 10.

FIG. 7 of the drawings illustrates the slidable positioning of the tubular member 18 within the handle member 12. In this regard, an aperture 42 is provided in the bar member 14 through which the tubular handle member 18 extends so as to facilitate reciprocal slidable movement between the members 12, 18. Additionally, it can be seen that a threaded attachment 44 of the tubular handle member 18 to the cleaning bar 22 may be utilized if desired. However, it is to be understood that any conventional form of attachment between the tubular member 18 and the cleaning bar 22 can be employed, and such attachment means forms no part of the present invention. FIG. 7 also illustrates how each of the tines 16 are slidably positioned through the array of apertures 26 while also emphasizing the fact that the tines 24 are fixedly attached to the cleaning bar 22.

With concurrent reference to FIGS. 1 and 8, it can be appreciated that when the tubular handle member 18 is moved forwardly within the tubular handle member 12 so as to force the cleaning bar 22 along an axial length of the tines 16, debris will be removed that is lodged between the sets of tines 16, 24. However, to achieve slidable relative movement between the handle members 12, 18, it is necessary to first depress the button 32 so that the tubular handle member 12 is released from locking engagement with the tubular handle member 18. During a reciprocal movement of the member 18 within the member 12, the button 32 could undesirably engage an additional aligned aperture 30 so as to momentarily stop the cleaning bar 22 from moving along the tines 16. To prevent this from happening, the tubular member 18 may be partially rotated within the tubular member 12 so as to misalign the button 32 once it has been pushed inwardly within one of the apertures 30. The handle 18 may then be reciprocated back and forth within the member 12 without the button coming into engagement with any of the apertures 30.

To facilitate the misalignment of the button 32 relative to the apertures 30, the rotational movement of the tubular member 18 is partially hampered by the cleaning bar 22 which will abut against the upstanding tines 16. To offset this problem to the degree necessary, FIG. 8 shows that the array of apertures 26 is designed to have apertures of increasing cross-sectional areas as they extend radially outwardly from the center 46 of the cleaning bar, 22. In this regard, the apertures 48, for example, are spaced the furtherest from the center 46 of the cleaning bar 22 and are of a larger dimension than the next set of apertures 50 which are more close to the center 46 of the bar. Similarly, the set of apertures 52 are of a still smaller cross-sectional area, and the next set of apertures 54 are even smaller still. This dimensioning of the apertures 26 results in a radial displacement 56 which forms a straight line to the center 46 and which then allows all of the tines 16 to simultaneously abut against interior edges of the apertures 48, 50, 52, 54 during a rotational movement of the cleaning bar 22. This provides a better stopping function, provides for maximum rotational movement of the tubular member 18 within the tubular member 12 without sacrificing strength in the cleaning bar 22, and provides for a vibrational impact on the tines 16 simultaneously across all of them so as to further help dislodge debris such as sand and dirt. In effect then, the cleaning bar 22 operates to dislodge leaves and similar vegetable matter by a sliding movement along the tines 16 and can further provide impact vibration to dislodge dirt and sticky matter.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new self-cleaning rake comprising:

first handle means, a cross bar interconnected to the first handle means;

second handle means slidably disposed within said first handle means, a cleaning bar connected to the second handle means;

first tine means comprising a plurality of first rake tines and being fixedly secured to the cross bar;

second tine means comprising a plurality of second rake tines and being fixedly secured to said cleaning bar, wherein said second tine means are positioned to be aliged and interdisposed with said first tine means, said second tine means being axially movable relative to said first tine means when said second handle means is slidably moved within said first handle means.

2. The new self-cleaning rake as in claim 1 and further including spring release means for facilitating a locking engagement between said first handle means and said second handle means.

3. The new self-cleaning rake as in claim 2 wherein said first rake tines are of a first length and said second rake tines are of a second length, said first length being greater than said second length.

4. The new self-cleaning rake as in claim 3 wherein said second rake tines being orthogonally attached to said cleaning bar.

5. The new self-cleaning rake as in claim 4 wherein said cleaning bar has a plurality of through-extending apertures, said first rake tines being aligned with and extending through said apertures.

6. The new self-cleaning rake as in claim 5 wherein said spring release means includes a depressible button which is engageable with one of a plurality of aligned apertures in said first handle means, thereby to adjustably determine a fixed overall combined length of said first and second handle means.

7. The new self-cleaning rake as in claim 6 wherein said through-extending apertures in said cleaning bar are of an enlarged size which permits substantial radial movement of said second rake tines.

8. The new self-cleaning rake as in claim 7 wherein said second handle means may be partially manually rotated within said first handle means when said depressible button is in a nonengaged position relative to said aligned apertures in said first handle means, thereby to effect a misalignment of said depressible button relative to all of said aligned apertures in said first handle means so as to allow uninterrupted relative reciprocable movement between said first handle means and said second handle means as would be experienced during a debris removal operation.

9. The new self-cleaning rake as in claim 8 wherein rotational movement of said first handle means relative to said second handle means is facilitated by said enlarged size of said through-extending apertures in said cleaning bar, said enlarged size facilitating a rotational movement of said cleaning bar relative to said first tine means, said rotational movement being limited by said second rake tines coming into abutment with an interior edges of said through-extending apertures in said cleaning bar.

10. The new self-cleaning rake as in claim 9 wherein said through-extending apertures in said cleaning bar are aligned on a radial axis extending outward from a center axis of said second handle means, said through-extending apertures being of an increasing size so as to allow all of said first rake tines to simultaneously abut against said interior edges of all of said through-extending apertures in said cleaning bar.

* * * * *